(12) United States Patent
Johnson et al.

(10) Patent No.: US 10,243,613 B1
(45) Date of Patent: Mar. 26, 2019

(54) TALKER FEEDBACK SYSTEM

(71) Applicant: Apple Inc., Cupertino, CA (US)

(72) Inventors: Martin E. Johnson, Los Gatos, CA (US); Robert D. Silfvast, Belmont, CA (US); Tom-Davy W. Saux, Los Altos, CA (US); Justin D. Crosby, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 15/275,193

(22) Filed: Sep. 23, 2016

Related U.S. Application Data

(60) Provisional application No. 62/232,865, filed on Sep. 25, 2015.

(51) Int. Cl.
| | | |
|---|---|---|
| *H04M 9/08* | (2006.01) | |
| *H04B 3/23* | (2006.01) | |
| *G10L 21/0208* | (2013.01) | |
| *H04R 3/02* | (2006.01) | |

(52) U.S. Cl.
CPC ............ *H04B 3/23* (2013.01); *G10L 21/0208* (2013.01); *H04R 3/02* (2013.01)

(58) Field of Classification Search
CPC ...................................................... H03G 3/32
USPC ................ 379/406.06, 88.17; 381/3, 74, 104
See application file for complete search history.

(56) References Cited

U.S. PATENT DOCUMENTS

| | | | | |
|---|---|---|---|---|
| 4,786,983 A | * | 11/1988 | Massari | G09B 5/04 360/13 |
| 7,940,897 B2 | * | 5/2011 | Khor | G06Q 30/02 379/88.02 |
| 8,364,298 B2 | * | 1/2013 | Griffith | G06F 3/16 370/286 |
| 2008/0187141 A1 | * | 8/2008 | Wang | H04B 1/3827 381/3 |
| 2012/0008800 A1 | * | 1/2012 | Goerke | H03G 3/32 381/104 |
| 2016/0192060 A1 | * | 6/2016 | Noertker | H04R 1/1075 381/74 |
| 2017/0076738 A1 | * | 3/2017 | Freudenthal | G10L 21/0388 |

* cited by examiner

*Primary Examiner* — Solomon G Bezuayehu
(74) *Attorney, Agent, or Firm* — Robert C. Kowert; Meyertons, Hood, Kivlin, Kowert & Goetzel, P.C.

(57) ABSTRACT

An audio communication system which enables two-way audio communication between at least two users in separate locations includes a talker feedback system which commands a set of audio drivers to generate an acoustical feedback signal which includes at least a portion of an audio input received from the talker to be directed to the talker. The acoustical feedback signal can be generated in response to an intensity of the talker-generated acoustical signal meeting a threshold level, and the feedback can result in causing the talker to reduce the intensity of the talker-generated audio content. The acoustical feedback signal can be directed to a limited portion of the environment in which the talker is located. The talker feedback system can provide at least some of the feedback to the talker via a haptic feedback device.

20 Claims, 4 Drawing Sheets

TALKER FEEDBACK SYSTEM

This application claims benefit of priority of U.S. Provisional Application Ser. No. 62/232,865, filed Sep. 25, 2015, which is hereby incorporated by reference herein in its entirety.

BACKGROUND

Technical Field

This disclosure relates generally to audio communication systems which enable two-way communication between a proximate user and a remotely-located user, and in particular to an audio communication system which provides a talker feedback signal to a proximate talker to cause the proximate talker to reduce an intensity of the talker-generated audio content.

Description of the Related Art

Some audio communication systems enable two-way audio communication between at least one end user which is located proximate to the audio communication system, also referred to herein as a "proximate user", "local user", etc., and at least one other end user supported by a remotely-located user device, also referred to herein as a "remote user", "remotely-located user", etc. The audio communication systems can include a microphone which receives audio input which includes talker audio content generated by the local user, a set of audio speakers, also referred to herein as audio drivers, which generate audio signals, signal patterns, etc., also referred to herein as acoustical signals, which include remote audio content generated by the remote user, and at least one transceiver, communicatively coupled to a user device supporting the remote user via one or more communication networks, which transmits at least the talker audio content to the user device and receives the remote audio content from the user device. The audio communication systems thereby enable real-time communication, near real-time communication, etc. between at least two remotely-located users. In some embodiments, the audio communication systems enable real-time communication, near real-time communication, etc. between at least two users located within a common interior, where the remotely located user, relative to a particular local user, comprises another local user positioned in a separate portion of the common interior relative to the particular local user.

As referred to herein, audio content generated by a local user can include spoken audio, vocal sounds, etc. generated as a result of the local user speaking into a microphone of the audio communication system to communicate with a remote user. A local user generating audio content can be referred to herein as a "talker", "talking user", etc. and a local user to which an audio communication system is directing one or more acoustical signals can be referred to herein as a "listener", "listening user", etc.

Audio content generated by a talker can be received at a microphone of the audio communication system as acoustical input signals. Acoustical input signals received at the microphone can include additional audio content in addition to talker-generated audio content, including ambient noise, background noise, etc. As referred to herein, a volume level of sound can be referred to as an intensity of acoustical signals. For example, a volume level of sound generated by a local user speaking into a microphone can be referred to as an intensity of talker audio content included in an acoustical input signal received at the microphone.

In some cases, a local user communicating with a remote user via an audio communication system can generate audio content of excessive intensity. For example, as a result of ambient noise, background noise, etc., a speaking user may increase a volume level of the talker's voice, thereby causing an increase in an intensity of talker audio content. In some cases, the talker can increase the intensity of the talker audio content to the point where the talker perceives the talker audio content generated by the talker to have an intensity sufficient to be perceived as speaking in a normal conversational tone. However, a remote user receiving the talker audio content via the audio communication system can perceive the talker audio content as being excessively loud, intense, etc. Such an increase can be known as the "Lombard Effect". In addition, other local users located proximate to the speaking user may find the talker audio content to be excessively loud, intense, etc. In some cases, when the talker is using headphones or earbuds, the headphones or earbuds block a local feedback loop of voice sound that the talker is accustomed to hearing naturally, and the talker raises his/her voice level to compensate.

SUMMARY OF EMBODIMENTS

Some embodiments provide an apparatus which includes an audio communication system which is configured to enable two-way audio communication between a talker located in an environment which is proximate to the audio communication system and a remotely-located user. The audio communication system includes a microphone which receives an acoustical input signal, wherein the acoustical input signal comprises talker audio content generated by the talker, a set of audio drivers, of a plurality of audio drivers, which is configured to generate audio output signals, comprising audio content received from the remotely located user, which are directed into the environment in which at least the talker is located, and a talker feedback system configured to, based on a determination that an intensity of the talker audio content comprised in the received acoustical input signal at least meets a threshold intensity value, command a selected set of audio drivers of the plurality of audio drivers, to generate an acoustical feedback signal which comprises at least a portion of the talker audio content, based on processing the acoustical input signal, and which is directed towards at least the talker. In some embodiments, an acoustical feedback signal which comprises at least a portion of the talker audio content comprises one or more processed instances of talker audio content.

Some embodiments provide a method which includes performing, by one or more computer systems, commanding at least one set of audio drivers to generate outlet acoustical signals, comprising audio content received from a remotely located device via a communication network, which are directed into an environment in which at least one listener is located, determining, based on processing an acoustical input signal received at a microphone located proximate to the environment, that the acoustical input signal comprises input audio content generated by the talker and that an intensity of the talker audio content comprised in the received acoustical input signal at least meets a threshold intensity value, and, in response to determining that an intensity of the talker audio content comprised in the received acoustical input signal at least meets a threshold intensity value, commanding a selected set of audio drivers, to generate an acoustical feedback signal which comprises at least a portion of the talker audio content and which is directed towards at least the talker.

Some embodiments provide a non-transitory computer readable medium storing a program of instructions which, when executed by at least one computer system, cause the at least one computer system to command at least one set of audio drivers to generate outlet acoustical signals, comprising audio content received from a remotely located device via a communication network, which are directed into an environment in which at least one listener is located, determine, based on processing an acoustical input signal received at a microphone located proximate to the environment, that the acoustical input signal comprises input audio content generated by the talker and that an intensity of the talker audio content comprised in the received acoustical input signal at least meets a threshold intensity value, and, in response to determining that an intensity of the talker audio content comprised in the received acoustical input signal at least meets a threshold intensity value, command a selected set of audio drivers, to generate an acoustical feedback signal which comprises at least a portion of the talker audio content and which is directed towards at least the talker.

DETAILED DESCRIPTION

Figure 1:
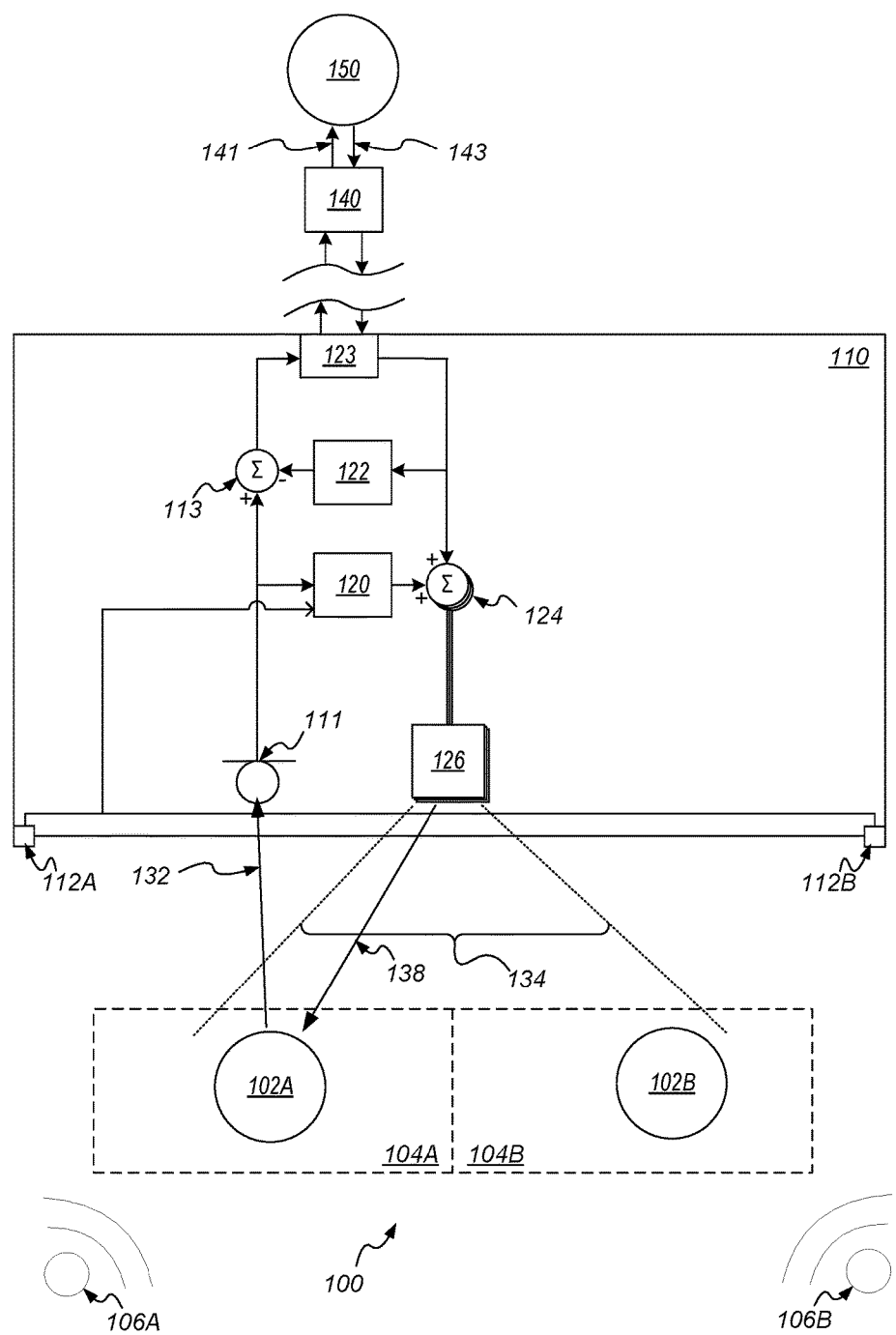
FIG. 1 illustrates a schematic block diagram of an audio communication system which includes a talker feedback system, according to some embodiments.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic block diagram of an audio communication system which includes a talker feedback system, according to some embodiments. The audio communication system 110, in some embodiments, is at least partially implemented by one or more computer systems, described below.

Audio communication system 110 enables two-way communication between one or more local users 102A-B, which are located in one or more portions 104A-B of an environment 100 which is proximate to the audio communication system 110, and at least one remote user 150 supported by a user device 140 which is communicatively coupled to the audio communication system 110. In some embodiments, user device 140 comprises a separate audio communication system 110. In some embodiments, the remote user 150 comprises one or more of the local users 102A-B, such that the system 110 enables two-way communication between two or more local users. The local users 102A-B can receive remote acoustical signals 134, based on acoustical signals 143 generated by the remote user 150 which are received at the remote user device 140 and utilized to generate communication signals which are communicated to the audio communication system 110 and used to command one or more sets of audio speakers 126, also referred to herein as audio drivers, transducers, etc. included in the system 110 to generate acoustical signals which comprise audio content provided by the remote user 150 in the remotely-generated acoustical signals 143. As a result, the local users 102A-B are provided with the audio content generated by the remote user 150 based at least in part upon the output acoustical signals 134 generated by the audio drivers 126. In some embodiments, the output acoustical signals 134 are generated by one or more sets of audio drivers which comprise a limited portion of the audio drivers 126 comprised in the audio communication system 110. In some embodiments, the one or more sets of audio drivers comprise one or more sets of headset devices, headphone devices, earbud devices, some combination thereof, etc.

The audio communication includes at least one microphone 111 which can receive acoustical signals generated by one or more sound sources in the proximate environment 100, including one or more of the local users 102A-B. As shown, where local user 102A generates audio content 132, for example as a result of user 102A speaking while facing the microphone 111, the user 102A can be referred to as a talker, local talker, etc. and the audio content 132 can be received at the microphone 111 as at least a part of acoustical signals received at the microphone 111. In some embodiments, the audio communication system 110 selectively adjusts which microphone 111, of one or more microphones 111, is used to receive audio content 132 based on a position of the microphone, relative to the talker 102A.

As also shown in FIG. 1, additional sound sources which are separate from the local talker 102A can be located in the proximate environment 100, such that acoustical signals generated by the additional sound sources are received at the microphone 111. As shown, sound sources 106A-B located proximate to the system 110 can generate acoustical signals which comprise ambient noise, background noise, etc. The acoustical signals received at microphone 111 can include the talker audio content 132 and the ambient noise generated by the ambient sound sources 106A-B.

As shown, system 110 includes a communication interface 123, which can include one or more transceiver devices, which can be communicatively coupled to the remote user device 140 via one or more communication networks. The acoustical input signals received at microphone 111 are communicated to interface 123 and communicated, via interface 123 to remote user device 140, where the device 140 can generate output acoustical signals 141 based on the acoustical input signals received at microphone 111. Where the input acoustical signals received at microphone 111 include talker audio content 132, the talker audio content can be provided to remote user 150 via acoustical signals 141.

As shown, in some embodiments, an audio communication system 110 includes an echo cancellation system 122 which processes remote audio content received from the remote user device 140 via interface 123 and, based on the processing, removes 113 echoes of the output acoustical signal 134, which includes the remote audio content, which is also received by the microphone 111.

In some embodiments, audio communication system 110 includes a talker feedback system which monitors the intensity of the talker audio content 132, at one or more frequencies, and, in response to an intensity of the talker audio content 132 at least meeting one or more threshold intensity levels at one or more frequencies, commands one or more audio drivers 126 included in the audio communication system 110 to generate an acoustical feedback signal 138 which comprises an at least partially processed instance of the talker audio content 132 and which is directed towards the talker 102A. As a result, the talker 102A receives an audio feedback of at least a portion of the audio content 132 generated by the talker 102A in response to the talker 102A generating audio content 132 which is too intense, loud, etc. at one or more frequencies.

The feedback 138 can prompt the talker 102A to reduce the intensity of the talker audio content 132 below one or more thresholds. Such prompting can include the talker being instinctively compelled to reduce talker audio content 132 intensity, such that prompting the talker 102A to reduce talker audio content 132 intensity can be referred to as causing the talker 102A to reduce talker audio content 132 intensity. As a result, an intensity of the acoustical signal 141 generated by device 140 and received by remote user 150 can be reduced, which can at least partially mitigate a probability of discomfort experienced by user 150 as a result of excessive intensity of the acoustical signal received at microphone 111 and communicated to device 140 and provided to user 150 via signal 141. In addition, as a result of talker 102A reducing an intensity of talker audio content 132, an intensity of the content 132 received by other local users, including user 102B, is similarly reduced, which can at least partially mitigate a probability of discomfort experienced by user 102B as a result of excessive intensity of the audio content 132, interference of the audio content 132 with signals 134 as perceived by user 102B. Reduced discomfort of users 102, 150 participating in two-way communication via system 110 can augment a communication experience for one or more of the participants. In addition to reduced discomfort, the reduced intensity of talker audio content can result in augmented "intimacy" of the communication experience, for example by promoting, supporting, a greater range of dynamic expression from the speaking local user, which can allow more meaning or intent to be conveyed, based on tone and timbre of voice, the variation of tone and timbre of voice, some combination thereof, etc.

As shown, system 110 includes a talker feedback system 120 which receives the acoustical signal received at microphone 111 and processes the signal to identify the talker audio content 132 included in the signal and to monitor the content 132, determining whether an intensity of the content, at one or more frequencies, at least meets one or more threshold intensity levels associated with the one or more frequencies. In response to determining that the audio content 132 at least meets a threshold intensity level at one or more frequencies, the system 120 can process the talker audio content 132 and provide the processed output to be combined 124 with the output received from the remote device 140 via interface 123, where the combined outputs are supplied to one or more audio drivers 126 so that, in addition to generating the output acoustical signals 134, system 110 generates an acoustical feedback signal which includes the processed output of system 120, where the processed output can include at least a portion of the talker audio content.

In some embodiments, the processed output of system 120 and the output of interface 123 are supplied to separate sets of audio drivers 126, so that at least one set of drivers 126 generates the output acoustical signals 134 and a separate one or more sets of drivers 126 generates the acoustical feedback signals 138. In some embodiments, the outputs of system 120 and interface 123 are combined to provide a combined input which is supplied to at least some of the drivers 126, so that the at least some of the drivers generate both of signals 134, 138.

In some embodiments, the audio communication system 110 provides, to a talker 102A, a feedback signal which is directed to the talker 102A so that the feedback signal 138 is at least partially restricted from being directed towards one or more portions of the environment 100 in which the talker 102A is absent, including one or more portions 104B in which one or more additional local users 102B are located.

In some embodiments, feedback system 120 is configured to control a directivity of the feedback signal 138, so that the feedback signal 138, when generated by one or more selected sets of audio drivers 126, is directed towards a particular limited portion 104A of the proximate environment in which the talker 102 is located. In some embodiments, the feedback system 120 controls a directivity of the signal 138 based at least in part upon selecting a particular set of drivers 126 and commanding the selectee set of audio drivers to generate acoustical signals which collectively generate a feedback signal which comprises a particular signal pattern which is directed towards the portion 104A of the environment and away from at least the portion 104B. For example, the system 120 can command a selected set of drivers 126 to collectively generate a signal pattern which at least partially augments, maximizes, some combination thereof, etc. an intensity of the feedback signal 138 in a particular direction towards a position associated with the talker 102A, command the selected set of drivers 126 to collectively generate a signal pattern which at least partially restricts, minimizes, some combination thereof, etc. an intensity of the feedback signal 138 in a particular direction towards a position associated with the listener 102B, some combination thereof, etc. In some embodiments, the selected set of drivers 126 are selected by system 126 and selectively commanded to generate feedback signals which collectively generate a feedback signal 138 comprising a particular signal pattern based on a determination that the particular set of drivers 126 are configured to generate a signal pattern which conforms to at least a threshold level of directivity in one or more particular directions, including a direction towards a position associated with the talker 102A.

Collective generation of a signal comprising a particular signal pattern can be implemented via beamforming techniques. For example, system 120 can command various audio drivers 126 included in a selected set of audio drivers 126 to generate various separate acoustical signals, where the various acoustical signals generated by the set of drivers collectively generate the feedback signal comprising a particular signal pattern, intensity, etc. based on beamforming via the various separate signals generated by the separate drivers in the set.

As a result of commanding a selected set of audio drivers 126 to generate a feedback signal 138 which is directed towards the talker 138, including a signal 138 which is configured to be at least partially restricted from being directed towards one or more portions 104B of the environment in which the talker 102A is absent, and one or more additional listeners 102B may be located, the feedback system 120 can enable augmented communication by providing feedback 138 to the appropriate target, talker 102A, to cause the talker to mitigate self-generated audio content 132 intensity while at least partially restricting such feedback 138 from being received by other local users 102B for which the feedback signal 138 may interfere with an ability of the local users 102B to receive and process the output acoustical signals 134. As a result, signals 134 and 138 can be generated simultaneously. As referred to herein, a signal which is "directed" towards a particular target, including a particular portion of the environment, user, etc., includes a signal which propagates towards the target, a signal pattern shaped, based on a directivity of the signal, to maximize signal propagation, intensity, etc. in a particular direction towards the particular target, etc.

In some embodiments, system 120 controls the generation of signal 138, so that the signal 138 is directed towards a particular portion 104A of the environment which includes a position associated with a talker 102A, based on sensor data representations of at least that portion of the environment, where the system 120 processes the representations and, based on the processing, identifies one or more local users 102A-B in the environment 104A-B, identifies a position of each of the local users 102A-B, identifies a particular one or more of the users 102A-B which are talkers which are generating talker audio content 132, some combination thereof, etc. As a result, the system 120 can, based on one or more of selectively selecting a particular set of audio drivers 126 to generate one or more feedback signals 138, controlling one or more of a directivity, intensity, etc. of the signal 138, etc., cause a generated feedback signal 138 to be configured to be directed towards a limited portion 104A of the environment in which the talker is positioned and be at least partially restricted from being directed towards one or more other portions 104B of the environment in which other local users may be positioned. In some embodiments, system 120 control a directivity of the feedback signals 138 to cause the signals to be at least partially restricted from being directed towards one or more particular portions 104B of the environment based on a determination that one or more local users 102B separate from the talker 102A are located in the one or more particular portions 104B, including one or more additional listeners located in a portion 104B of the environment in which the output acoustical signals 134 are directed.

In some embodiments, the system 120 controls a directivity of the feedback signal 138 to at least partially mitigate receipt of the signal 138 at the microphone 111. For example, system 120 can control a directivity of signal 138 to cause an intensity of the generated signal 138 in a direction towards the microphone 111 to be at least partially restricted, minimized, some combination thereof, etc.

As shown in FIG. 1, system 110 can include a set of sensor devices 112A-B which can monitor the proximate environment and generate one or more sensor data representations of the monitored environment, including one or more sensor data representations of one or more portions 104A-B of the environment. A sensor data representation of one or more portions 104A-B of the environment can include a sensor data representation of one or more local users 102A-B located in the one or more portions. As shown, sensor data representations generated by the devices 112A-B, which can also be referred to herein as sensor data generated by the devices 112A-B, can be communicated to the feedback system 120, and the feedback system 120 can, based on processing the sensor data representations, identify one or more of the users 102A-B in one or more particular portions 104A-B of the environment. The identifying can include identifying separate particular portions 104A-B in which separate particular users 102A-B are located, identifying separate positions in the environment which are associated with one or more particular users 102A-B, identifying one or more of the users 102A-B as a talker generating talker audio content 132, some combination thereof, etc. Identifying a particular user 102A as a talker can include processing sensor data representations of the talker 102A in addition to processing acoustical signals received at microphone 111, including monitoring body gestures of the talker via facial recognition, correlating certain gestures, mouth movements, etc. with one or more instances of audio content received at microphone 111, etc. Based on the processing, the system 120 can determine a particular position in the environment, a particular portion of the environment which includes a particular position, etc. to which the feedback signal 138 is to be configured to be directed so that the signal 138 is directed to a limited portion of the environment in which a position associated with the talker is located, is at least partially restricted from being directed to one or more portions of the environment in which one or more additional listeners 102B are located, etc.

In some embodiments, the system 120 controls the content of the feedback signal 138 based on processing the talker audio content 132 included in the acoustical input signal received at microphone 111, so that the feedback signal 138 includes at least a portion of the talker audio content. Such processing can include isolating the talker audio content from other sounds included in the input signal, including ambient noise. In some embodiments, such processing includes isolating one or more particular portions of the talker audio content, and including the isolated one or more particular portions in the feedback signal 138, based on audio content frequency, where the isolated one or more portions of the talker audio content include one or more portions of the talker audio content within a certain range of audio frequencies. For example, a particular portion of the talker audio content which is greater in frequency than a particular threshold frequency level, including a low-frequency threshold can be isolated from the input signal received at microphone 111 and included in the feedback signal 138, so that the talker 102A receives, as feedback, a portion of the talker audio content 132 which is greater in frequency than the particular threshold frequency. Such isolation can augment feedback performance, as lower-frequency audio content feedback via an acoustical signal 138 may be less perceptible to talker 102A than higher-frequency feedback. The isolating described above can be referred to as at least partially filtering the one or more portions of the acoustical input signal and providing the filtered portions as filtered output of the feedback system 120.

In some embodiments, system 120 adjustably controls an intensity of the feedback signal 138 based on monitoring the talker 102A via one or more of the microphone 111 and sensor devices 112A-B. In some embodiments, the microphone 111 comprises one or more microphones 111. For example, system 120 can adjust an intensity of the feedback signal 138 in proportion to an intensity of the audio content, so that the feedback signal 138 varies in intensity with variations in intensity of the talker audio content 102A. In some embodiments, the system 120 adjusts an intensity of the feedback signal 138 based on monitoring talker audio content intensity subsequent to providing the feedback signal 138 at a given intensity, where the system 120 increases the intensity of signal 138 based on elapsed time, subsequent to initially providing the signal 138, during which the intensity of content 132 remains above one or more threshold intensity levels. As a result, system 120 can provide additional prompts, stimuli, etc. to the talker 102A to induce the talker 102A to reduce the intensity of content 132 by increasing the feedback intensity 138 as the content 132 intensity increases, increasing the feedback intensity 138 as the talker 102A does not reduce content 132 intensity below one or more threshold intensity levels within a certain amount of elapsed time subsequent to the signal 138 being generated at a given intensity level, some combination thereof, etc.

Figure 2:
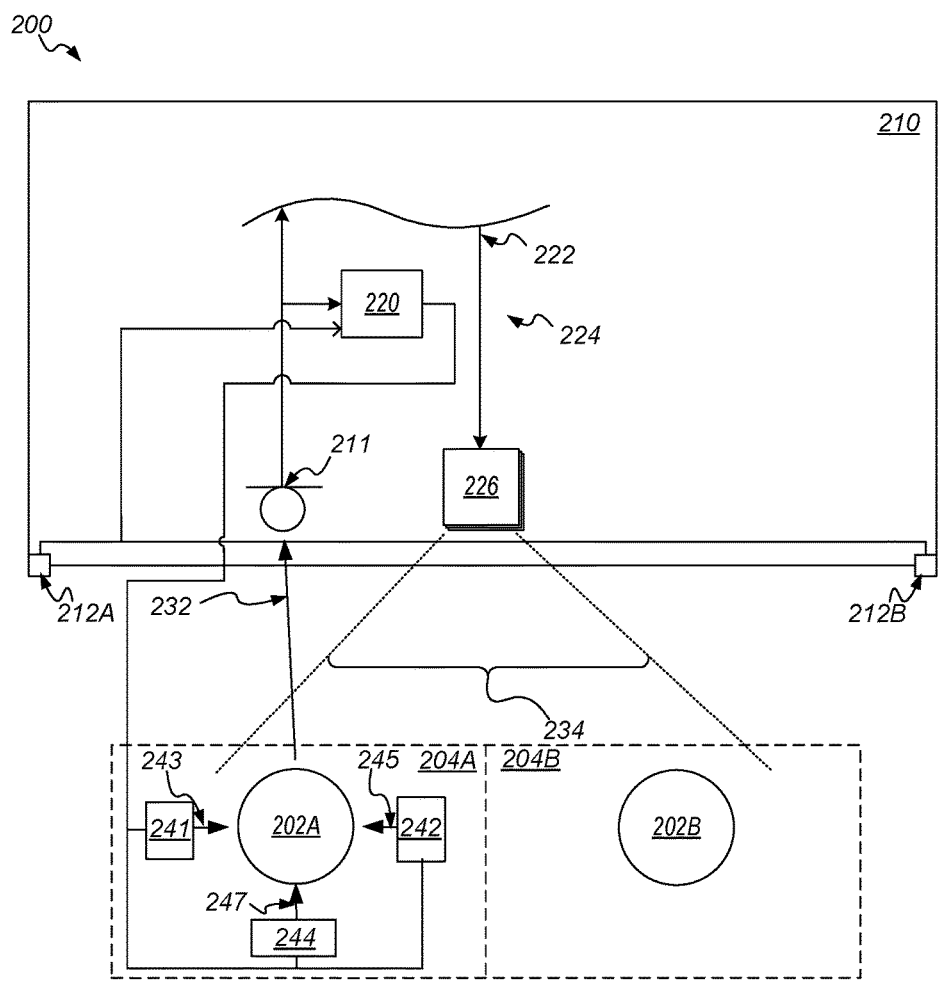
FIG. 2 illustrates a schematic block diagram of an audio communication system which includes a talker feedback system, a set of audio drivers positioned proximate to a local user position, and a haptic feedback device, according to some embodiments.

FIG. 2 illustrates a schematic block diagram of an audio communication system which includes a talker feedback system, a set of audio drivers positioned proximate to a local user position, and a haptic feedback device, according to some embodiments. At least some of the audio communication system 210 illustrated in FIG. 2 can be included in any of the embodiments of audio communication systems included herein, including the system 110 illustrated in FIG. 1.

In some embodiments, the audio communication system includes one or more sets of audio drivers which are located in one or more particular portions of the proximate environment 200 and which are configured to generate acoustical signals which are directed into one or more particular limited portions of the environment, which can include one or more positions within one or more portions of the environment in which the one or more sets of audio drivers are located.

In some embodiments, the audio communication system includes a feedback system which, based at least in part upon identifying a talker as being positioned within a particular portion of the proximate environment, selecting a particular set of audio drivers which are positioned at least proximate to the particular portion of the environment and which are configured to generate acoustical signals which are directed into the limited portion of the environment which includes the particular portion of the environment in which the talker is identified as being positioned. As a result, the feedback signal can be directed towards the particular local user for which the feedback can be used to adjust the talker audio content, while at least partially restricting the feedback signal from being directed towards other portions of the proximate environment in which other local users may be present, and for whom the feedback signal can interfere with a communication experience.

As shown, the audio communication system 210 located in environment 200, which includes portions 204A-B in which respective users 202A-B are located, includes a microphone 211, audio drivers 226 which present an output acoustical signal 234 based on a remote audio content 222 received from a remote user, sensors 212A-B which monitor at least the portions 204A-B of the environment 200, and a talker feedback system 220 which commands one or more sets of drivers to generate a feedback signal which is directed towards a position associated with an identified talker. In some embodiments, microphone 211 comprises one or more microphones. As shown, the system 210 further includes a set of audio drivers 241-242 which are located within portion 204A of the environment and are configured to generate acoustical signals 243, 245 which are directed towards a position associated with the talker 202A. Based on processing sensor data representations generated by one or more of sensors 212A-B, acoustical input signals received at microphone 211, some combination thereof, etc. system 220 can identify talker 202A as generating talker audio content 232 received at microphone 211 and as being associated with a position located within portion 204A of the environment 200. System 220 can, based on the identification, select a particular set of audio drivers 241-242 to generate the feedback signal based on the location of the drivers 241-242 in portion 204A in which the position associated with talker 202A is located, based on the drivers 241-242 being configured to generate acoustical signals which are directed towards portion 204A independently of other portions 204B f the environment in which one or more identified positions associated with one or more other local users 202B are located, some combination thereof, etc. Based on selection of the drivers 241-242, the system 220 can command the drivers 241-242 to generate acoustical signals 243, 245 which collectively comprise the feedback signal. For example, system 220 can command driver 241 to generate a signal 243 which comprises a left channel of the feedback signal and can further command driver 242 to generate a signal 245 which comprises a right channel of the feedback signal, so that the talker 202A receives a stereo image comprising the feedback signal.

In some embodiments, an audio communication system includes a haptic feedback device 244 which is located proximate to a portion associated with a local user 202A and is configured to apply one or more sets, patterns, etc. of physical force to the local user 202A, and the feedback system 220 is configured to command the haptic feedback device 244 to apply one or more physical forces to the talker 202A based on the determination that the audio content 232 intensity, at one or more frequencies, at least meets one or more threshold intensity levels. In some embodiments, the haptic feedback is commanded, by system 220, to apply a haptic feedback pattern of physical forces which correspond to at least a portion of the talker audio content. For example, system 220 can isolate a portion of the audio content 232 which is associated with frequencies below a low-frequency threshold and command the feedback device 244 to apply a pattern of physical forces 247 which correspond to the isolated portion of audio content, thereby converting the isolated low-frequency portion of the audio content into a pattern of physical forces and applying the pattern of physical forces to the talker 202A to provide low-frequency feedback signals which can be received by the talker, independently of other local users 202B. The physical pattern of physical forces 247 can be referred to as haptic feedback signals. In some embodiments, the haptic feedback signals can be controlled, by system 220, similarly relative to the acoustical feedback signals. For example, system 220 can control the intensity of the haptic feedback signals 247 in proportion to the intensity of the audio content 232 at one or more frequencies, so that the intensity of the feedback provided to the talker varies in proportion with the intensity of the audio content.

The feedback device 244 and drivers 241-242 can be concurrently selected and controlled to provide feedback signals 243, 245, 247, via processing talker audio content 232, based on location of the devices. In addition, the devices 241, 242, 244 can be controlled to provide audio feedback and haptic feedback based on separate portions of audio content 232. For example, devices 241, 242, 244 can be selected to provide feedback to talker 202A based on a determination that the devices are located in a common portion 204A of the environment 200 relative to a position associated with the talker 202A and are configured to direct feedback signals to the position, independently of other positions associated with other local users in other portions of the environment. The audio content 232 can be isolated into separate portions based on a low-frequency threshold, where a low-frequency portion comprising a portion of the audio content having frequencies below that of the low frequency threshold are used to command haptic feedback device 244 to generate a haptic feedback signal 247 based on the low-frequency portion, and a high-frequency portion comprising a portion of the audio content having frequencies above that of the low frequency threshold are used to command audio drivers 241-242 to generate acoustical feedback signals 243, 245 based on the high-frequency portion. As a result, the talker 202A receives feedback of high-frequency portions of the talker audio content 232 via acoustical signals and further receives feedback of low-frequency portions of the talker audio content 232 via haptic signals, which can result in augmented feedback, as low-frequency talker audio content feedback may be more perceptible to the talker via haptic feedback than audio feedback, and high-frequency talker audio content feedback may be more perceptible to the talker via audio feedback than haptic feedback.

As referred to herein, a pattern of physical forces, haptic feedback signal, etc. can include a sequence of physical forces, including vibration forces, generated by one or more components of a haptic feedback device. A pattern of physical forces can include acoustic vibration. Applying a pattern of physical forces to a local user can include applying a "vibratory stimulation" to a local user?

In some embodiments, an audio communication system, which can include any of the embodiments of audio communication systems included herein, is located in an interior cabin of a vehicle, which can include an automobile, truck, aircraft, watercraft, etc., and a particular portion of the environment in which a local user can be located can include a seat in which the local user can be seated. In some embodiments, audio drivers 241, 242, haptic feedback devices 244, etc. located in a particular portion 204A of the environment 200 are incorporated into a structure of a seat located in the portion 204A and in which the talker 202A is seated, such that the devices 241, 242, 244 are configured to provide feedback which is directed towards the occupant of the seat, independently of occupants of other seats of in the environment. For example, the haptic feedback device 244 can be incorporated into a backrest, bottom rest, leg rest, arm rest, etc. of a seat located in portion 204A, and audio drivers 241-242 can be incorporated into a headrest of the seat, so that the haptic feedback device 244 can apply physical forces to a talker 202A occupying the seat, and the audio drivers 241-242 can generate acoustical signals proximate to the ears of the talker 202A occupying the seat.

In some embodiments, one or more instances of personal data associated with one or more local users can be utilized to augment the communication experience. For example, personal data associated with a user can include, in addition to identification data, including facial recognition data, which can be used by a feedback system to identify a particular user associated with personal data based on processing a sensor data representation of the user in the proximate environment, one or more instances of feedback preference data which indicate one or more various intensity levels, frequency ranges, etc. via which generated feedback signals directed towards a user associated with the personal data are to conform. Thus, users can benefit from use of personal data. Use of such personal data enables users to influence and control feedback signals provided to the users to augment the communication experience. In some embodiments, personal data can be used to "train" the audio communication system, so that the audio communication system adaptively adjusts the talker feedback signal, without manual intervention, to optimize the signal to cause the talker to moderate talker audio content intensity, based on the response of the specific user to feedback signals over time.

Users, which can include local users, occupants, etc., can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

Figure 3:
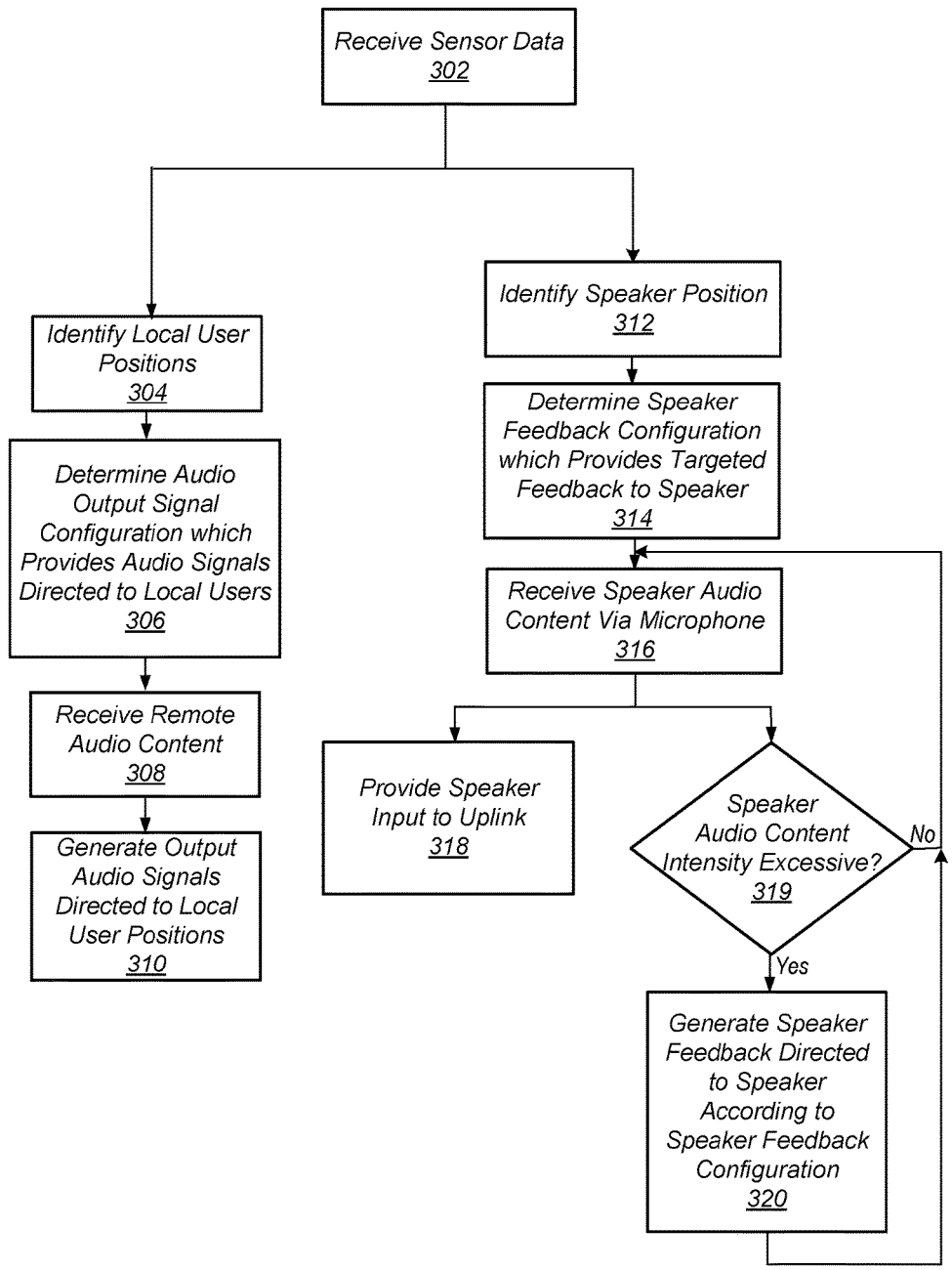
FIG. 3 illustrates providing talker feedback to a local speaking user communicating with a remote user, according to some embodiments.

FIG. 3 illustrates providing talker feedback to a local speaking user communicating with a remote user, according to some embodiments. The providing can be implemented by one or more talker feedback systems included in one or more audio communication systems, which themselves can be implemented by one or more computer systems.

At 302, sensor data is received from one or more sensor devices. The sensor data can include one or more sensor data representations of one or more portions of a proximate environment. The sensor devices can include one or more various sensor devices, including camera devices, light beam scanning devices, ultrasonic sensors, radar, etc. Camera devices can include visible light cameras, infrared cameras, near-infrared cameras, depth cameras, etc. The sensor devices can include, in some embodiments, a microphone, vibration transducer, etc. located proximate to a user, e.g., in a seat, which can detect voice signals coupled from the thorax of the person speaking.

At 304, based on the sensor data, positions associated with one or more local users in the proximate environment are identified. At 306, a configuration of one or more audio output signals which are directed towards a selection of the identified local users, including a limited set of the local users which are located within a certain proximity of one or more portions of the audio communication system, is determined. The configuration can include a selected set of audio drivers which are selected to generate the audio output signals according to the determined configuration At 308, one or more instances of remote audio content are received from a remote user device via one or more communication networks. At 310, based on the remote audio content and the determined audio output signal configuration, the selected set of audio drivers are commanded to generate one or more audio output signals which comprise at least a portion of the received remote audio content according to the determined audio output signal configuration.

At 312, a position in the proximate environment which is associated with a local speaking user, also referred to herein as a talker, is identified, based at least in part upon one or more of sensor data received at 302, acoustical input signals received at a microphone, some combination thereof, etc.

At 314, a talker feedback configuration which provides one or more feedback signals, which can include one or more acoustical feedback signals, haptic feedback signals, etc. to the identified talker via one or more selected audio drivers, haptic feedback devices, etc. is determined. The determined configuration can include a configuration of an acoustical feedback signal, including selected audio drivers to generate at least a portion of the signal, a directivity of the signal, etc. which results in the acoustical feedback signal being directed towards a limited portion of the environment in which the identified talker is located. Such directivity configuring can include configuring the feedback signal to comprise a signal pattern which maximizes signal intensity in a particular direction towards a position associated with the talker, minimizes signal intensity in another separate direction towards a separate position, some combination thereof, etc. The separate position can include a position associated with another separate identified local user in the proximate environment, a position associated with a microphone device, some combination thereof, etc.

At 316, one or more instances of talker audio content, generated by the identified talker, are received in one or more instances of acoustical input signals received at a microphone. The microphone, in some embodiments, comprises one or more microphones. At 318, the talker audio content is communicated to a remote user device via one or more communication networks.

At 319, a determination is made regarding whether the intensity of the talker audio content, at one or more particular frequencies, at least meets one or more threshold intensity levels. If so, as shown at 320, one or more instances of feedback signals are provided to the talker according to the determined talker feedback configuration.

Figure 4:
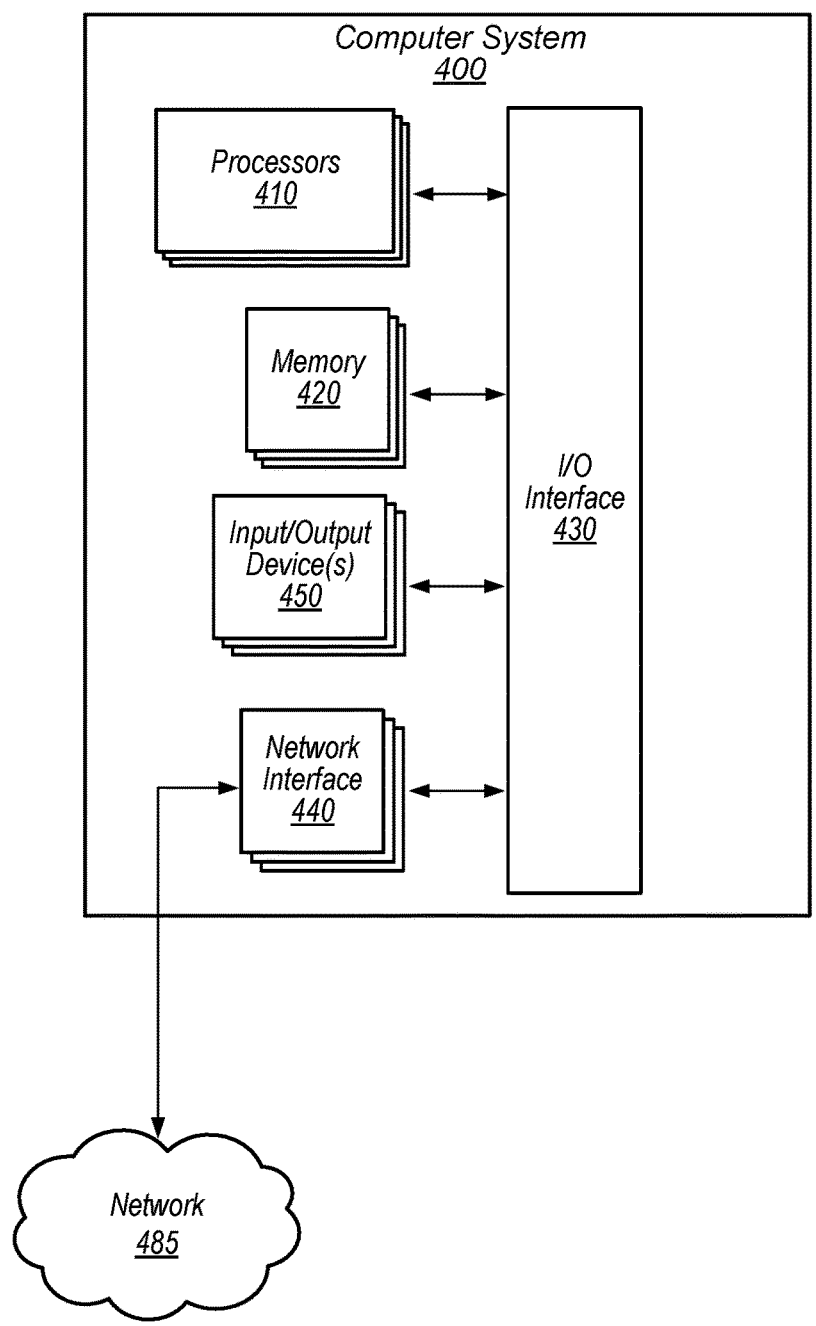
FIG. 4 illustrates an example computer system configured to implement one or more portions of an audio communication system, according to some embodiments.

FIG. 4 illustrates an example computer system 400 that may be configured to include or execute any or all of the embodiments described above. In different embodiments, computer system 400 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an audio communication system, talker feedback system, some combination thereof, etc., as described herein, may be executed in one or more computer systems 400, which may interact with various other devices. Note that any component, action, or functionality described above with respect to FIGS. 1 through 3 may be implemented on one or more computers configured as computer system 400 of FIG. 4, according to various embodiments. In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices, which can include one or more user interface (also referred to as "input interface") devices. In some cases, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

System memory 420 may be configured to store program instructions, data, etc. accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 420 may be configured to implement some or all of an ANS, incorporating any of the functionality described above. Additionally, existing control data of memory 420 may include any of the information or data structures described above. In some embodiments, program instructions and/or data may be received, sent or stored upon different types of computer-accessible media or on similar media separate from system memory 420 or computer system 400. While computer system 400 is described as implementing the functionality of functional blocks of previous Figures, any of the functionality described herein may be implemented via such a computer system.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network 485 (e.g., carrier or agent devices) or between nodes of computer system 400. Network 485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 400. Multiple input/output devices may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

Memory 420 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   an audio communication system which is configured to enable two-way audio communication between at least two users, wherein the at least two users comprises one or more local users located in an environment which includes the audio communication system, wherein the one or more local users comprises a talking local user, and wherein the audio communication system comprises:
   one or more microphones configured to receive an acoustical input signal in the environment, wherein the acoustical input signal comprises talker audio content generated by the talking local user;
   one or more audio drivers which are configured to generate audio output signals, comprising audio content received from a remotely located device of at least one user of the at least two users via a communication network, which are directed into the environment in which at least one or more local users are located; and
   a talker feedback system configured to, based on an intensity of the talker audio content comprised in the received acoustical input signal:
   command a selected set of audio drivers of the plurality of audio drivers, to generate an acoustical feedback signal which comprises at least a portion of the talker audio content and which is directed towards at least the talking local user, wherein to generate the acoustical feedback signal the talker feedback system is further configured to at least partially process the acoustical input signal to isolate the at least a portion of the talker audio content from other sounds in the acoustical input signal, wherein the acoustical feedback signal comprises a directional signal pattern.

2. The apparatus of claim 1, wherein:
   the one or more local users located in the environment which includes the audio communication system comprises at least one additional local user located in the environment;
   the set of audio drivers is configured to generate output acoustical signals, comprising audio content received from the at least one user of the at least two users, which are directed into a portion of the environment in which at least both the talking local user and the at least one additional local user are located;
   the audio communication system is configured to, based on processing at least one sensor data representation, of the environment, generated by one or more sensor devices monitoring the environment, identify a position of the talking local user and a position of the at least one additional local user in the environment, and
   the talker feedback system is configured to, based at least in part upon the identification of the position of the talking local user and the position of the at least one additional local user, command the selected set of audio drivers to generate the acoustical feedback signal such that the acoustical feedback signal is directed towards a limited portion of the environment in which the talking local user is located, independently of a separate portion of the environment in which the at least one additional local user is located.

3. The apparatus of claim 2, wherein:
   the talker feedback system is configured to select a particular set of audio drivers, of the plurality of audio drivers, as the selected set of audio drivers, and command the selected set of audio drivers to generate the feedback signal, based on a determination that the particular set of audio drivers are configured to generate acoustical signals which are directed towards the limited portion of the environment in which the talking local user is located, independently of the separate portion of the environment in which the at least one additional local user is located.

4. The apparatus of claim 2, wherein:
   to command a selected set of audio drivers of the plurality of audio drivers to generate an acoustical feedback signal which is directed towards at least the talking local user, the talker feedback system is configured to:
control a directivity of the acoustical feedback signal generated by the selected set of audio drivers to cause the acoustical feedback signal to comprise a particular signal pattern which propagates in a direction towards the limited portion of the environment in which the talking local user is located and is at least partially restricted from propagating towards the separate portion of the environment in which the at least one additional local user is located.

5. The apparatus of claim 4, wherein:
to control a directivity of the acoustical feedback signal, the talker feedback system is configured to command the selected set of audio drivers to generate a set of acoustical signals which collectively generate the acoustical feedback signal via beamforming.

6. The apparatus of claim 3, wherein:
the acoustical input signal further comprises ambient background noise which is separate from the talker audio content generated by the talking local user; and
commanding a selected set of audio drivers to generate an acoustical feedback signal which comprises at least a portion of the talker audio content, based on processing the acoustical input signal, comprises:
processing the acoustical input signal to generate a filtered output which isolates, from the acoustical input signal:
the ambient background noise, and
a particular portion of the talker audio content associated with one or more audio frequencies which are located within a particular range of audio frequencies; and
selecting, as the feedback signal, the filtered output.

7. The apparatus of claim 6, wherein:
the particular portion of the talker audio content associated with one or more audio frequencies which are located within a particular range of audio frequencies comprises a portion of the talker audio content associated with one or more audio frequencies which are greater than a low-frequency threshold.

8. The apparatus of claim 7, wherein:
the talker feedback system is configured to, based on the determination that an intensity of the talker audio content comprised in the received acoustical input signal at least meets a threshold intensity value, command a haptic feedback device, located in a common portion of the environment relative to the talking local user, to apply at least one physical force to the talking local user.

9. The apparatus of claim 8, wherein:
the talker feedback system is configured to control a magnitude of the physical force applied by the haptic feedback device, based on the intensity of at least a portion of the talker audio content comprised in the received acoustical input signal, such that the magnitude of the physical force is proportional to the intensity of at least a portion of the talker audio content.

10. The apparatus of claim 8, wherein:
to control a magnitude of the physical force applied by the haptic feedback device, based on the intensity of the talker audio content comprised in the received acoustical input signal, the talker feedback system is configured to command the haptic feedback device to apply a pattern of physical force which is proportional to an intensity of a selected portion of the talker audio content associated with one or more audio frequencies which are lower than the low-frequency threshold.

11. The apparatus of claim 1, wherein:
the talker feedback system is configured to controllably adjust an intensity of the acoustical feedback signal, based on the intensity of at least a portion of the talker audio content comprised in the received acoustical input signal, such that the intensity of the acoustical feedback signal is proportional to the intensity of at least a portion of the talker audio content.

12. The apparatus of claim 11, wherein:
the talker feedback system is configured to increase an intensity of the acoustical feedback signal in response to a determination that the intensity of at least a portion of the talker audio content at least meets the threshold intensity value for at least a particular period of elapsed time subsequent to commanding the selected set of audio drivers to generate the acoustical feedback signal.

13. A method, comprising:
Performing, by one or more computer systems:
commanding at least one set of audio drivers to generate outlet acoustical signals, comprising audio content received from a remotely located device via a communication network, which are directed into an environment in which at least one local user is located, wherein the at least one local user comprises at least one talking local user;
determining, based on processing an acoustical input signal received at a microphone located in the environment, that the acoustical input signal comprises input audio content generated by the at least one talking local user and that an intensity of the talker audio content comprised in the received acoustical input signal at least meets a threshold intensity value; and
in response to determining that an intensity of the talker audio content comprised in the received acoustical input signal at least meets a threshold intensity value, commanding a selected set of audio drivers, to generate an acoustical feedback signal which comprises at least a portion of the talker audio content and which is directed towards the at least one talking local user, wherein commanding the selected set of audio drivers to generate the acoustical feedback signal comprises partially processing the acoustical input signal to isolate the at least a portion of the talker audio content from other sounds in the acoustical input signal, wherein the acoustical feedback signal comprises a directional signal pattern.

14. The method of claim 13, wherein:
the outlet acoustical signals are directed into a portion of the environment in which both the at least one talking local user and at least one additional local user are located;
the method further comprises performing, by one or more computer systems:
identifying a position of the at least one talking local user and a position of at least one additional local user in the environment, based on processing at least one sensor data representation, of the environment, generated by one or more sensor devices monitoring the environment;
based at least in part upon the identification of the position of the at least one talking local user and the position of the at least one additional local user, commanding the selected set of audio drivers to generate the acoustical feedback signal such that the acoustical feedback signal is directed towards a limited portion of the environment in which the at least one talking local user is located, independently of a separate portion of the environment in which the at least one additional local user is located.

15. The method of claim 14, wherein:
commanding the selected set of audio drivers to generate the acoustical feedback signal which is directed towards the at least one talking local user comprises:
controlling a directivity of the acoustical feedback signal generated by the selected set of audio drivers to cause the acoustical feedback signal to comprise a particular signal pattern which propagates in a direction towards the limited portion of the environment in which the at least one talking local user is located and is at least partially restricted from propagating towards the separate portion of the environment in which the at least one additional local is located.

16. The method of claim 13, comprising:
performing, by one or more computer systems:
in response to the determination that the intensity of the talker audio content comprised in the received acoustical input signal at least meets the threshold intensity value, commanding a haptic feedback device, located in a common portion of the environment relative to the talker, to apply a physical force to the at least one talking local user.

17. A non-transitory computer readable medium storing a program of instructions which, when executed by at least one computer system, cause the at least one computer system to:
command at least one set of audio drivers to generate outlet acoustical signals, comprising audio content received from a remotely located device via a communication network, which are directed into an environment in which at least one listener is located, wherein the at least one listener comprises at least one talking local user;
determine, based on processing an acoustical input signal received at a microphone located in the environment, that the acoustical input signal comprises input audio content generated by the at least one talking local user and that an intensity of the talker audio content comprised in the received acoustical input signal at least meets a threshold intensity value; and
in response to determining that an intensity of the talker audio content comprised in the received acoustical input signal at least meets a threshold intensity value, command a selected set of audio drivers, to generate an acoustical feedback signal which comprises at least a portion of the talker audio content and which is directed towards the at least one talking local user, wherein to command the selected set of audio drivers to generate the acoustical feedback signal comprises to at least partially process the acoustical input signal to isolate the at least a portion of the talker audio content from other sounds in the acoustical input signal, wherein the acoustical feedback signal comprises a directional signal pattern.

18. The non-transitory computer readable medium of claim 17, wherein:
the outlet acoustical signals are directed into a portion of the environment in which both the at least one talking local user and at least one additional local user are located;
the program of instructions, when executed by the at least one computer system, cause the at least one computer system to:
identify a position of the at least one talking local user and a position of at least one additional local user in the environment, based on processing at least one sensor data representation, of the environment, generated by one or more sensor devices monitoring the environment; and
based at least in part upon the identification of the position of the at least one talking local user and the position of the at least one additional local user, command the selected set of audio drivers to generate the acoustical feedback signal such that the acoustical feedback signal is directed towards a limited portion of the environment in which the at least one talking local user is located, independently of a separate portion of the environment in which the at least one additional local user is located.

19. The non-transitory computer readable medium of claim 18, wherein:
commanding the selected set of audio drivers to generate the acoustical feedback signal which is directed towards at least the talker comprises:
controlling a directivity of the acoustical feedback signal generated by the selected set of audio drivers to cause the acoustical feedback signal to comprise a particular signal pattern which propagates in a direction towards the limited portion of the environment in which the at least one talking local user is located and is at least partially restricted from propagating towards the separate portion of the environment in which the at least one additional local user is located.

20. The non-transitory computer readable medium of claim 17, wherein the program of instructions, when executed by the at least one computer system, cause the at least one computer system to:
in response to the determination that the intensity of the talker audio content comprised in the received acoustical input signal at least meets the threshold intensity value, command a haptic feedback device, located in a common portion of the environment relative to the talker, to apply a physical force to the at least one talking local user.

* * * * *